United States Patent Office 3,338,956
Patented Aug. 29, 1967

3,338,956
PROCESS FOR THE MANUFACTURE OF URETHANES BY REACTION OF A HYDROXYL COMPOUND, CARBON MONOXIDE, AND AN ALIPHATIC OR AROMATIC NITRO COMPOUND
Brian Arthur Mountfield, Manchester, England, assignor to Imperial Chemical Industries Limited, London, England, a corporation of Great Britain
No Drawing. Filed Dec. 16, 1963, Ser. No. 330,626
Claims priority, application Great Britain, Dec. 21, 1962, 48,475/62
9 Claims. (Cl. 260—471)

This invention relates to the manufacture of urethanes.

According to the present invention we provide a process for the manufacture of urethanes by reacting an organic compound containing at least one hydroxyl group with carbon monoxide and with a nitrogenous compound containing at least one non-cyclic group in which a nitrogen atom is directly attached to a single carbon atom and through a double bond to an oxygen or another nitrogen atom.

Hydroxy compounds for use in the process may be, for example, mono or polyhydric alcohols containing primary, secondary or tertiary hydroxyl groups as well as mono and polyhydric phenols. Mixtures of these hydroxy compounds may also be used. The alcohols may be aliphatic or aromatic and may bear other substituents in addition to hydroxyl groups but the substituents should, except as hereinafter described, preferably be non-reactive to carbon monoxide under the reaction conditions.

Generally the hydroxyl group containing compounds conform with one or other of the general formulae $R(OH)_n$ and $Ar(OH)_n$ wherein $n$ is 1 or more and preferably from 1 to 3, R is an optionally substituted aliphatic, cycloaliphatic or aralphatic group preferably containing from 1 to 20 carbon atoms, Ar is an aromatic group containing one or more benzenoid rings and preferably not more than 3 rings which may be fused or joined by single valency bonds, directly or through bridging groups which may be, for example, oxygen or sulphur atoms or sulphoxide, sulphone or carbonyl groups, or alkylene groups in which if desired the carbon chain may be interrupted by, for example, oxygen or sulphur atoms, sulphoxide, sulphone or carbonyl groups, for example methylene, oxymethylene, dimethylene sulphone or dimethylene ketone groups.

The group R may be alkyl, cycloalkyl, alkylene, cycloalkylene or aralkyl and the main carbon chain may if desired be interrupted, for example, by oxygen or sulphur atoms, sulphoxide, sulphone, carbonyl or carboxylic ester groups. The main chain may bear as substituents, for example, alkyl, alkoxy, aryl or aryloxy groups normally containing less than 10 carbon atoms. Especially suitable compounds of the formula $R(OH)_n$ are monohydric alycohols such as methyl, ethyl, n-, and sec- propyl, n-, iso-, sec and tert butyl, amyl, hexyl, lauryl, cetyl, benzyl, chlorobenzyl and methoxybenzyl alcohols as well as diols such as ethylene glycol, diethylene glycol, propylene glycol and dipropylene glycol, triols such as glycerol, trimethylol propane, hexanetriol, tetrols such as pentaerythritol and the ethers of such polyols providing that at least one OH group remains unetherified. The etherifying group in such ether alcohols normally contain up to 10 carbon atoms and is preferably an alkyl, cycloalkyl or aralkyl group which may be substituted, for example, a halogenoalkyl group. An especially suitable compound of the formula $R(OH)_n$ is methanol but other preferred compounds are ethanol, propanol, butanol, ethylene glycol, glycerol and trimethylol propane.

The phenolic compounds of the general formula $Ar(OH)_n$ may carry substituents in the benzenoid rings, for example, alkyl and alkoxy groups containing up to 10 carbon atoms and halogen atoms. Suitable mono and polyhydric phenols include phenol, chlorophenol, methyl, ethyl, butyl and alkyl phenols, catechol, resorcinol, quinol, 4,4'-dihydroxydiphenylmethane, naphthols, chloronaphthols, methyl, ethyl, butyl and octyl naphthols, anthranols, chloroanthranols, methyl, ethyl, butyl and octyl anthranols, phenanthrols, chlorophenanthrols, methyl, ethyl, butyl and octyl phenanthrols, pyrogallol, phloroglucinol, hydroxyquinol and the ethers of the polyhydroxyphenols providing at least one OH remains unetherified. The etherifying group in such ethers normally contains up to 10 carbon atoms and is preferably an alkyl, cycloalkyl or aralkyl group which may be substituted, for example, a halogenoalkyl group. Among the abovementioned aromatic compounds phenol, chlorophenol, octylphenol, 4:4'-dihydroxydiphenylmethane, naphthols, anthranols and phenanthrols are particularly preferred and especially phenol itself.

As suitable nitrogenous compounds containing at least one non-cyclic group in which a nitrogen atom is directly attached to a single carbon atom and through a double bond to oxygen or another nitrogen atom I mention organic nitro, nitroso, azo and azoxy compounds, of which organic nitro compounds are generally preferred.

As examples of nitro compounds for use in the process I mention mononitro compounds such as nitrobenzene, alkyl and alkoxy nitrobenzenes wherein the alkyl group contains up to 10 carbon atoms, aryl and aryloxy nitrobenzenes, wherein the aryl group is phenyl, tolyl, xylyl, naphthyl, chlorophenyl, chlorotolyl, chloroxylyl or chloronaphthyl, chloronitrobenzenes, dinitro compounds such as dinitrobenzene, alkyl and alkoxy dinitrobenzenes wherein the alkyl group contains up to 10 carbon atoms, aryl and aryloxy dinitrobenzenes wherein the aryl group is any of those mentioned above, chlorodinitrobenzenes, trinitro compounds such as trinitrobenzene, alkyl and alkoxytrinitrobenzenes, aryl and aryloxytrinitrobenzenes, the substituents being any of those already mentioned and chlorotrinitrobenzenes as well as similarly substituted mono and polynitro derivatives of the naphthalene, diphenyl, diphenylmethane, anthracene and phenathrene series. Substituted or unsubstituted aliphatic nitro compounds such as nitromethane, nitroethane, nitropropane, nitrobutane, 2:2-dimethyl nitrobutane, nitrocyclopentane, nitrocyclohexane, nitrocyclobutane, 3-methylnitrobutane, nitrooctadecane, 3-nitropropene-1, phenyl nitromethane, p-bromophenyl nitromethane, p-nitrophenyl nitromethane, p-methoxy phenyl nitromethane, dinitroethane, dinitropropane, dinitrobutane, dinitrohexane, dinitrodecane, dinitrocyclohexane, dinitromethyl cyclohexane, di-(nitrocyclohexyl)-methane are also suitable. From this group of nitro compounds nitrobenzene, nitrotoluene, dinitrobenzene, dinitrotoluene, trinitrobenzene, trinitrotoluene, mononitronaphthalene, dinitronaphthalene, 4:4'-dinitrodiphenylmethane, nitrobutane, nitrocyclohexane, p-nitrophenylnitromethane, dinitrocyclohexane, dinitromethyl cyclohexane, dinitrocyclohexylmethane, are preferred and in particular aromatic nitro compounds especially 2:4- and 2:6-dinitrotoluenes, and meta and para dinitrobenzenes.

Examples of suitable nitroso compounds are the aromatic nitroso compounds such as nitrosobenzene, nitrosotoluene, dinitrosobenzene, dinitrosotoluene and the aliphatic nitroso compounds such as nitrosobutane, nitrosocyclohexane and dinitrosomethylcyclohexane.

Examples of azo compounds of general formula $R_1$—$N$=$N$—$R_2$ wherein $R_1$ and $R_2$ may be either the same or different substituted or unsubstituted alkyl or aryl groups selected from amongst those already listed in the description of suitable nitro compounds. Azobenzene, nitroazobenzene, chloroazobenzene and alkyl or aryl substituted azobenzene are particularly preferred.

Examples of azoxy compounds of general formula

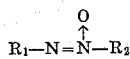

wherein $R_1$ and $R_2$ may be the same or different substituted or unsubstituted alkyl or aryl groups selected from amongst those already listed in the description of suitable nitro compounds. Azoxybenzene, nitroazoxybenzene, chloroazoxybenzene, alkyl and aryl substituted azoxybenzenes are particularly preferred.

The invention includes the use of any mixture of nitro compounds, nitroso compounds, azo or azoxy compounds with any mixture of hydroxy compounds and also the use of compounds containing both functions, i.e. hydroxynitro compounds, hydroxy nitroso compounds, hydroxyazo and hydroxyazoxy compounds such as 2-hydroxynitroethane, 2-hydroxynitrosoethane, nitrophenols, nitro naphthols, nitrosophenols, nitrosonaphthols, hydroxyazobenzenes and hydroxyazoxybenzene. Mixtures of these nitrogen-containing compounds may also be used.

The process of the invention has been found to proceed most smoothly to give the highest yields when employing nitro compounds. It is accordingly preferred to use nitro compounds rather than nitroso, azo or azoxy compounds.

The process of the invention is conveniently carried out at super atmospheric pressure, for example at between 50 and 500 atmospheres, preferably at temperatures up to 250°, particularly from 75° to 175° and preferably in the presence of a catalyst. Catalysts suitable for use in the process include metal carbonyls, for example, the carbonyls, hydrogen carbonyls, halogen carbonyls, hydrocarbon carbonyls, hydrocarbon halogen carbonyls, nitroso carbonyls and cyano carbonyls of elements in groups VI$a$, VII$a$ and VIII$a$ of the Periodic Table such as Cr, Mo, W, Mn, Fe, Co, Ni, Ru, Rh, Os and Ir. Rhodium compounds are preferred. The carbonyls are preferably employed in catalytic amounts, for example from 0.1 to 5% by weight of the nitro compounds, and may be formed in situ from the metal or from other metal compounds.

If desired the process of the invention may also be carried out in presence of inert diluents in which the non-gaseous reactants are soluble.

The invention is useful for the preparation of compounds containing one or more urethane groups and which may be monomeric or polymeric in nature. Thus the reaction may be adopted for the preparation of monourethanes from mononitro compounds, nitroso compounds, azo compounds or azoxy compounds and monohydroxy compounds and for the preparation of polyurethanes from polynitro compounds, polynitroso, nitro or nitroso substituted azo or azoxy compounds and monofunctional hydroxy compounds. The urethane products of the process of this invention, in particular those urethanes containing not more than three urethane groups per molecule may be converted to the corresponding isocyanates for example by heating or other methods fully described in the prior art.

Additionally polyurethane polymers may be obtained by the interaction of polynitro, polynitroso or nitro substituted azo or azoxy compounds with polyols and carbon monoxide. Thus linear polyurethanes, useful for example as fibres or elastomers, may be obtained directly, for example, from diols, dinitro compounds and carbon monoxide or from hydroxynitro compounds and carbon monoxide whilst crosslinked polyurethane polymers, useful for example as flexible or rigid plastics, may be obtained directly from, for example, mixtures of di- or polynitro compounds, diols or polyols and carbon monoxide.

The invention is illustrated but not limited by the following examples in which parts are by weight.

*Example 1*

Nitrobenzene (25 parts), methanol (80 parts) and carbon monoxide were heated together with rhodium chlorocarbonyl (0.32 part) at 150° for 12 hours under a maximum pressure of 130 atmospheres in a stirred enamel lined autoclave. After cooling, the liquid residue was submitted to fractional distillation and yielded methanol, dimethylaniline (3.7 parts) B.P. 75–80°/10 mm., a fraction (1.3 parts) B.P. 120–130°/10 mm., shown by petrol extraction to be a mixture of methyl N-phenyl urethane (0.4 part) and dimethyl aniline (0.9 part), and a main fraction (27.7 parts) consisting of methyl N-phenyl urethane B.P. 137–140°/15 mm. M.P. 48°, mixed M.P. 48°, leaving a still residue (1.0 part).

*Example 2*

Nitrobenzene (25 parts), butanol (80 parts) and carbon monoxide were heated toegther with rhodium chlorocarbonyl (0.42 part) at 150° for 18½ hours at a maximum pressure of 126 atmospheres in a stirred enamel lined autoclave. After cooling and filtration, on distillation the liquid product afforded butanol, impure aniline (8.4 g.) B.P. 70–72°/10 mm. Equivalent weight 96.8, a mixture of butylated anilines (2.9 g.) B.P. 80–110°/10 mm. Equivalent weight 161.9 and a pale yellow liquid (6.6 g.) B.P. 120–140°/10 mm. equivalent weight 230, containing N-butyl diphenyl amine. Dry hydrogen chloride gas was passed into a petrol solution of this pale yellow liquid (4.5 parts) when a white precipitate of amine hydrochloride was formed. The petrol was decanted and the solid extracted four times at 40° C. These petrol extracts were combined and on evaporation afforded an oily liquid (0.7 g.), the infra-red spectrum of which confirmed the presence of butyl N-phenylurethane with bands at 3.0, 5.85, 6.5, 7.6 and 9.4 $\mu$ contaminated with some N-butyl diphenylamine.

*Example 3* p-Dinitrobenzene (3 parts) methanol (120 parts) and carbon monoxide were heated together with rhodium chlorocarbonyl (0.52 part) at 150° for 7 hours at a maximum pressure of 125 atmospheres in a stirred enamel lined autoclave. After cooling and filtration, the liquid afforded a solid (3.5 parts) on evaporation of the methanol under vacuum. The infra-red spectrum of this solid showed bands at 3.0, 5.8, 7.95 and 9.4 $\mu$ typical of urethane groups indicating the conversion of a nitro group to a urethane group in p-dinitrobenzene.

*Example 4* m-Dinitrobenzene (25 parts), methanol (80 parts) and carbon monoxide were heated together with rhodium chlorocarbonyl (0.45 part) at 150° for 10¼ hours at a maximum pressure of 118 atmospheres. After cooling, the methanol was removed by evacuation leaving a solid (24.3 parts). The infra-red spectrum of this solid showed bands at 3.0, 5.85, 6.5, 8.13 and 9.3 $\mu$ typical of urethane groups indicating the conversion of a nitro group to a urethane group in m-dinitrobenzene.

What is claimed is:

1. A process for the preparation of urethanes by the reaction at superatmospheric pressures and temperatures of up to about 250° C. of carbon monoxide with at least one hydroxyl group containing compound selected from the group consisting of aliphatic and aromatic alcohols and phenols and at least one nitrogen containing compound selected from the group consisting of aliphatic and aromatic nitro compounds, in the presence of a metal carbonyl catalyst wherein the metal is an element of Groups VI$a$, VII$a$ and VIII$a$.

2. A process for the manufacture of urethanes which comprises reacting at superatmospheric pressures and temperatures of up to about 250° C., in the presence of a metal carbonyl catalyst wherein the metal is an element of Groups VI$a$, VII$a$ and VIII$a$ carbon monoxide with (1) at least one organic compound containing at least one hydroxyl group and conforming to one of the general formulae $R(OH)_n$ and $Ar(OH)_n$ where $n$ is at least 1, R is selected from the group consisting of aliphatic, cycloaliphatic and araliphatic groups and Ar is an aromatic group containing at least one benzenoid ring, with (2) at least one nitrogenous compound selected from the group consisting of mono-, di- and tri-nitrobenzene, naphthalene, diphenyl, diphenylmethane, anthracene and phenanthrene, alkyl and alkoxy mono-, di-, and tri-nitrobenzenes, naphthalenes, diphenyls, diphenylmethanes, anthracenes and phenanthrenes in which the alkyl and alkoxy groups contain up to 10 carbon atoms, aryl and aryloxy, mono-, di- and tri-nitrobenzenes, naphthalenes, diphenyls, diphenylmethanes, anthracenes and phenanthrenes in which the aryl groups and the aryl portions of said aryloxy groups are taken from the class consisting of phenyl, tolyl, xylyl, naphthyl, chlorophenyl, chlorotolyl, chloroxylyl and chloronaphthyl, chloro- mono-, di-, and tri-nitrobenzenes, naphthalenes, diphenyls, diphenylmethanes, anthracenes and phenanthrenes, nitromethane, nitroethane, nitropropane, nitrobutane, 2:2-dimethylnitrobutane, nitrocyclopentane, nitrocyclohexane, nitrocyclobutane, 3-methylnitrobutane, nitrooctadecane, 3-nitropropene-1, phenyl nitromethane, p-bromophenyl nitromethane, p-nitrophenyl nitromethane, p-methoxy phenyl nitromethane, dinitroethane, dinitropropane, dinitrobutane, dinitrohexane, dinitrodecane, dinitrocyclohexane, dinitromethyl cyclohexane, and di-(nitrocyclohexyl)-methane.

3. A process according to claim 2 in which the carbon monoxide and the materials (1) and (2) are reacted at a pressure between 50 and 500 atmospheres.

4. A process according to claim 3 in which said temperature is from 75° to 175° C.

5. A process according to claim 2 in which the compound (2) is nitrobenzene.

6. A process according to claim 2 in which the compound (2) is dinitrobenzene.

7. A process according to claim 2 in which the compound (2) is dinitrotoluene.

8. A process according to claim 2 in which the compound (1) is methanol.

9. A process according to claim 2 in which the compound (1) is butanol.

References Cited

UNITED STATES PATENTS 3,245,774    4/1966    Bachmann _____ 260—471

RICHARD K. JACKSON, *Primary Examiner.*

D. D. HORWITZ, *Examiner.*

L. A. THAXTON, *Assistant Examiner.*